July 1, 1924.
E. C. POOL
WEIGHING MECHANISM
Filed Dec. 26, 1919
1,499,782
7 Sheets-Sheet 4
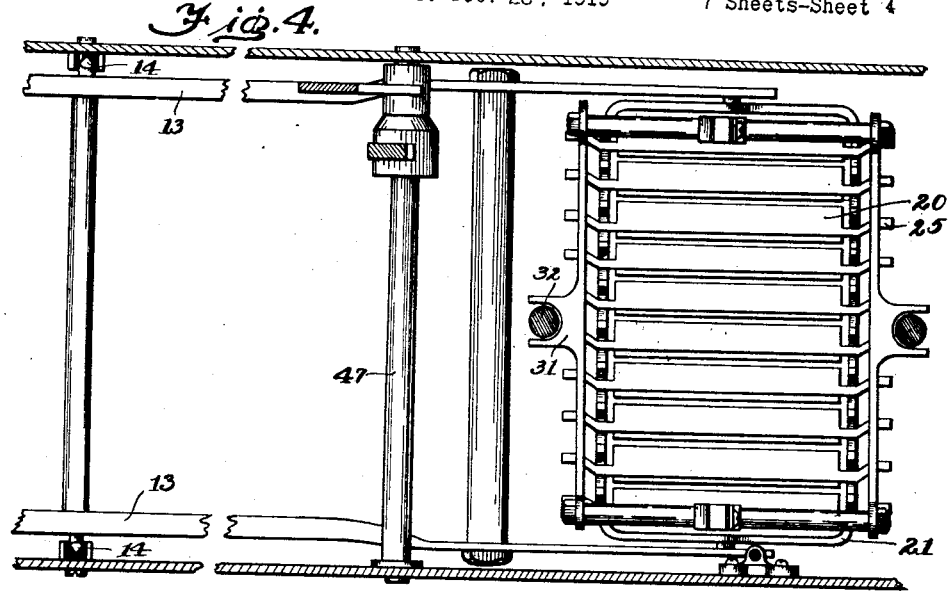
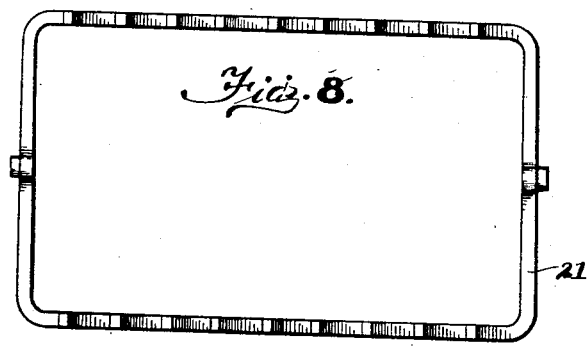
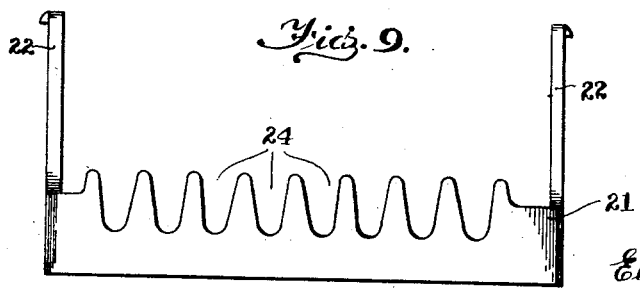
Witness
C. E. Wilcox
Inventor
Elmer C. Pool.
By George R. Frye
Attorney

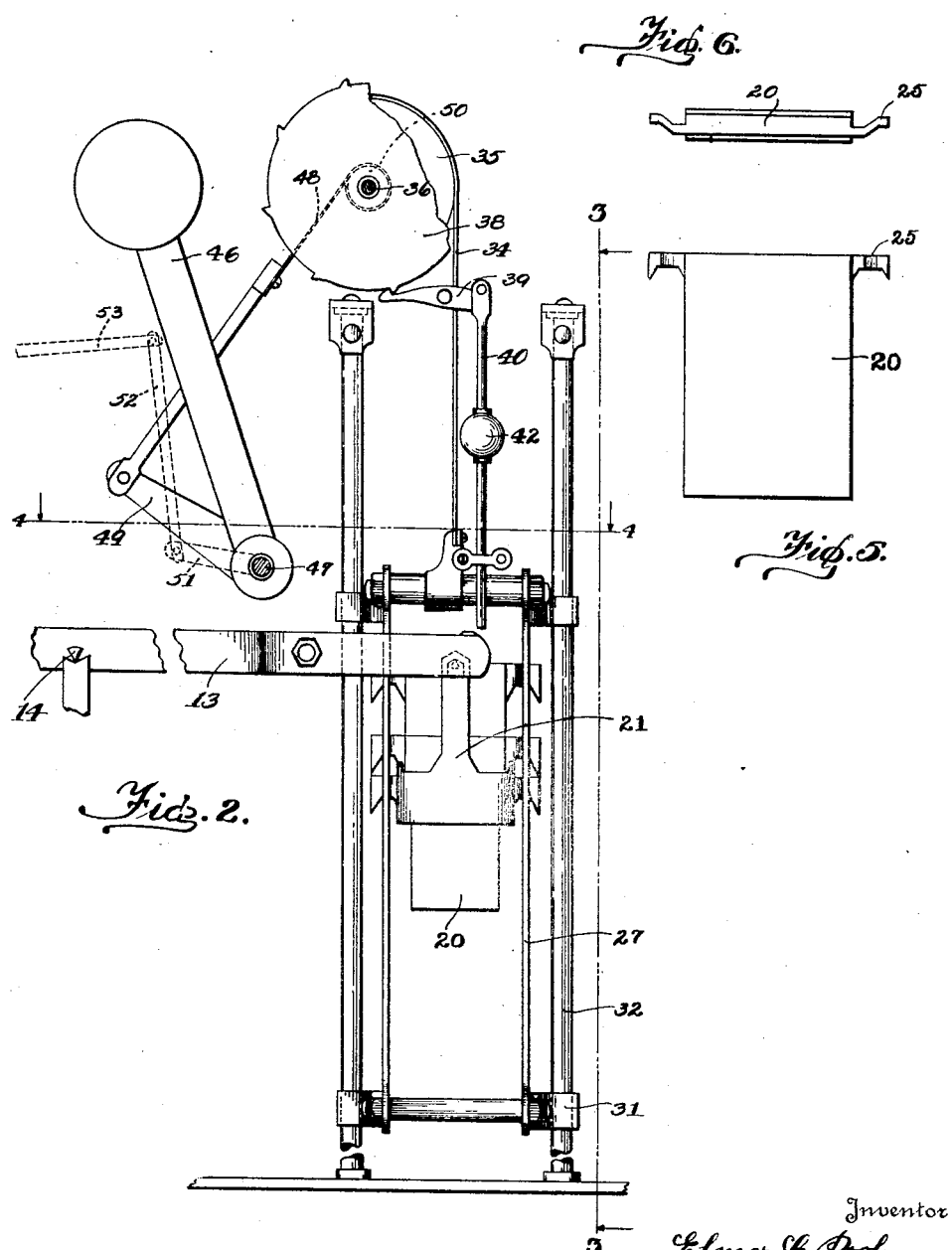

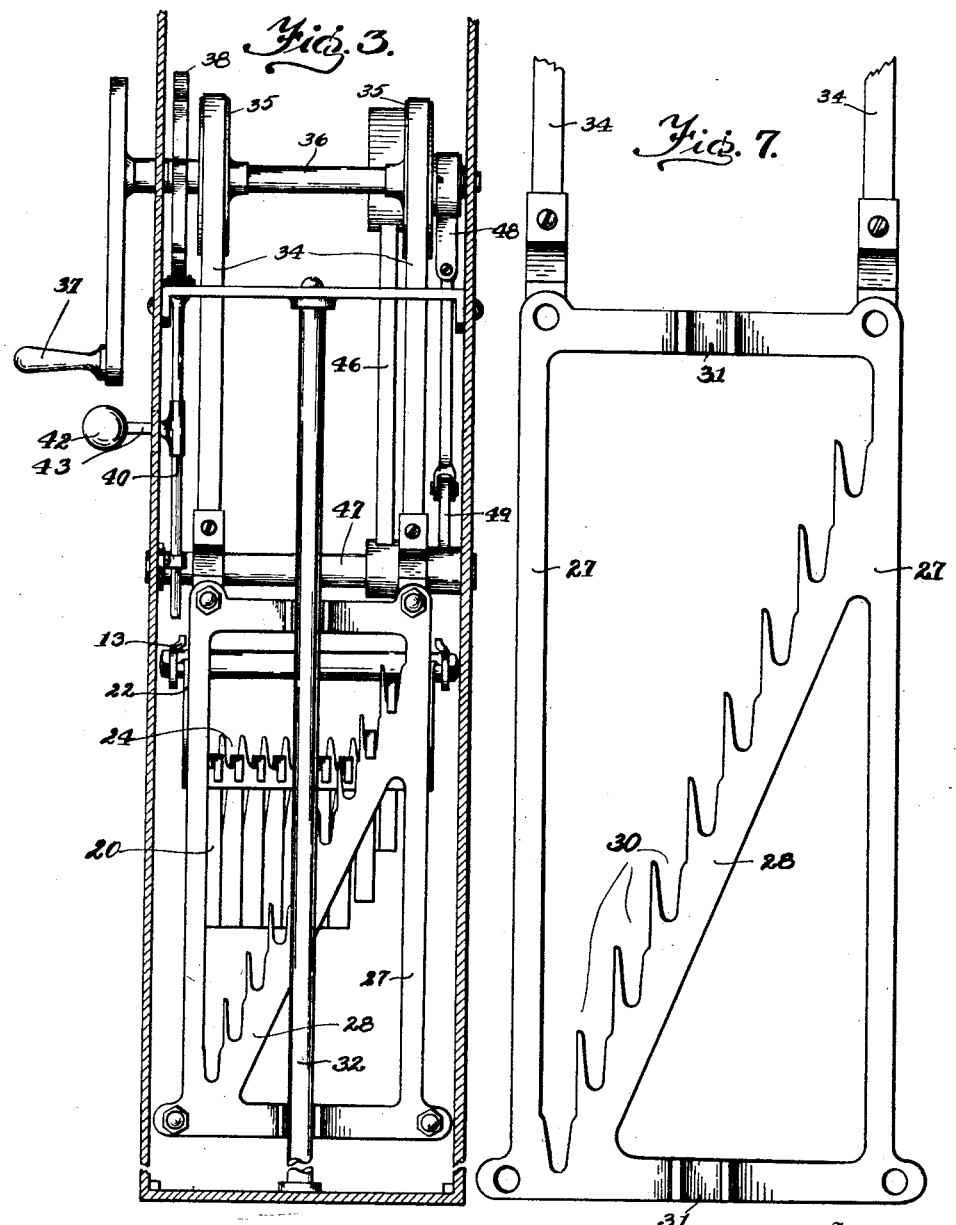

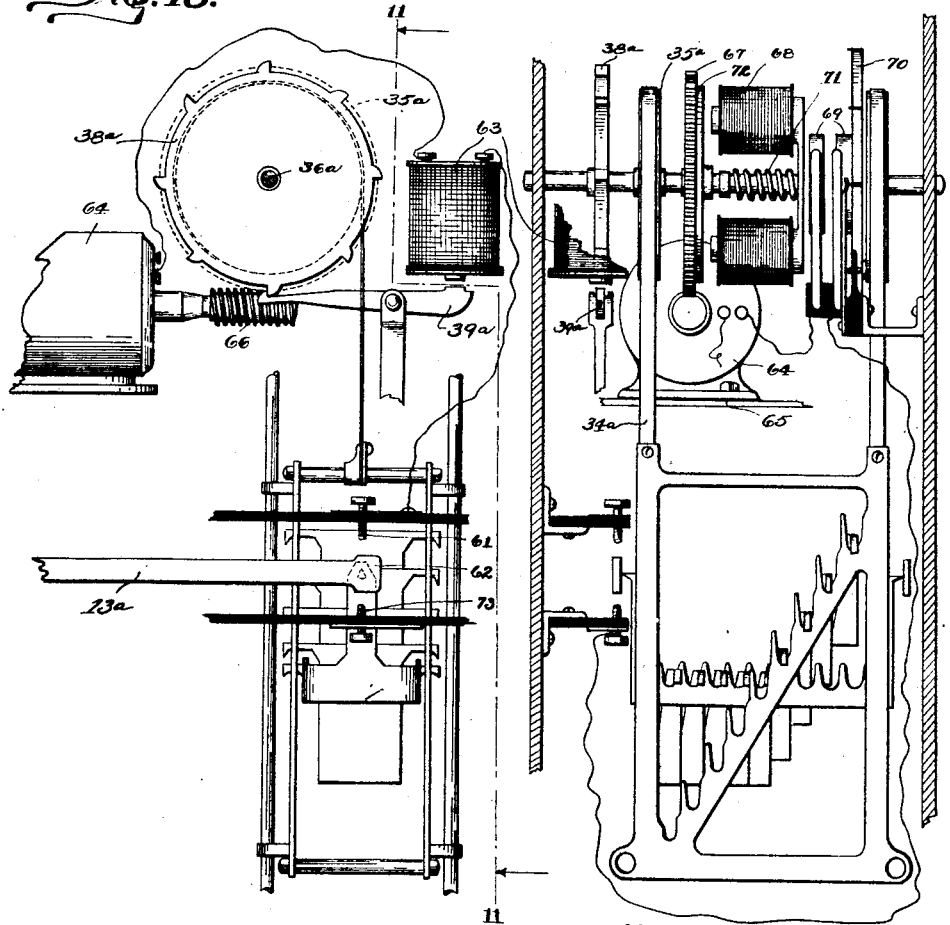

July 1, 1924.

E. C. POOL

WEIGHING MECHANISM

Filed Dec. 26, 1919

Witness
C. E. Hilcox

Inventor
Elmer E. Pool.

By George R. Frye.
Attorney

July 1, 1924.

E. C. POOL

WEIGHING MECHANISM

Filed Dec. 26, 1919

Witness
C. E. Wilcox

Inventor
Elmer C. Pool.

By George R. Frye
Attorney

Patented July 1, 1924.

1,499,782

UNITED STATES PATENT OFFICE.

ELMER C. POOL, OF NEW CASTLE, PENNSYLVANIA, ASSIGNOR TO TOLEDO SCALE COMPANY, OF TOLEDO, OHIO, A CORPORATION OF NEW JERSEY.

WEIGHING MECHANISM.

Application filed December 26, 1919. Serial No. 347,434.

*To all whom it may concern:*

Be it known that I, ELMER C. POOL, a citizen of the United States, residing at New Castle, in the county of Lawrence and State of Pennsylvania, have invented certain new and useful Improvements in Weighing Mechanism, of which the following is a specification.

This invention relates to weighing scales, particularly scales designed to weight comparatively heavy loads and having beam mechanism for offsetting the major parts of such loads and automatic mechanism for offsetting the remainder thereof.

One of the objects of my invention is to provide an improved device by means of which the unit counterpoises may be automatically deposited upon or removed from a weighing beam to counterbalance a part of the load on the scale.

Another object is to so arrange the unit counterpoises that an adequate number may be deposited upon or removed from the beam with a minimum movement of the depositing mechanism.

Another object is to so form the poises that they may be compactly arranged upon the beam, and to make them of such form that poises of different weights may be used without altering the weighing or depositing mechanism.

Still another object is to so form the poises that as each poise is deposited on the lever it will swing away from the adjacent undeposited poise, thus avoiding any interference with the movement of the scale.

Other objects and advantages will be apparent from the following description in which reference is had to the accompanying drawings illustrating a preferred embodiment of my invention and wherein similar reference numerals designate similar parts throughout the several views.

In the drawings:

Figure 2 is a front elevation of the mechanism for depositing poises on a weighing beam;

Figure 3 is a side elevation of the mechanism shown in Figure 2, part of the cabinet being shown in section;

Figure 4 is a sectional plan view taken on the line 4—4 of Figure 2;

Figures 5 and 6 are respectively a front elevation and plan of one of the unit counterpoises;

Figure 7 is a side elevation of the counterpoise-carrying cage;

Figures 8 and 9 are respectively a plan and a side elevation of the device for suspending the counterpoises from the weighing mechanism;

Figure 10 is a front elevation of an electric device for automatically depositing the unit counterpoises on the weighing mechanism and removing them therefrom;

Figure 11 is a section on the line 11—11 of Figure 10.

Figure 1:
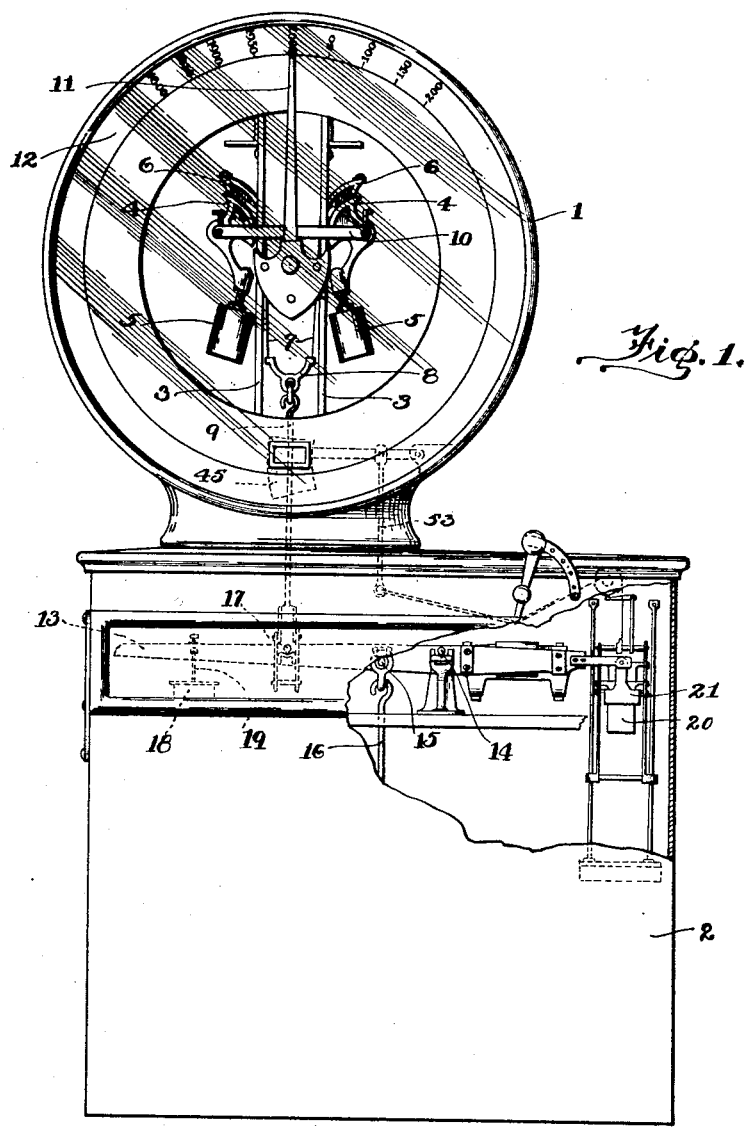
Figure 1 is an elevation of a portion of a scale embodying my invention, part of the cabinet walls being broken away.
Figure 12:
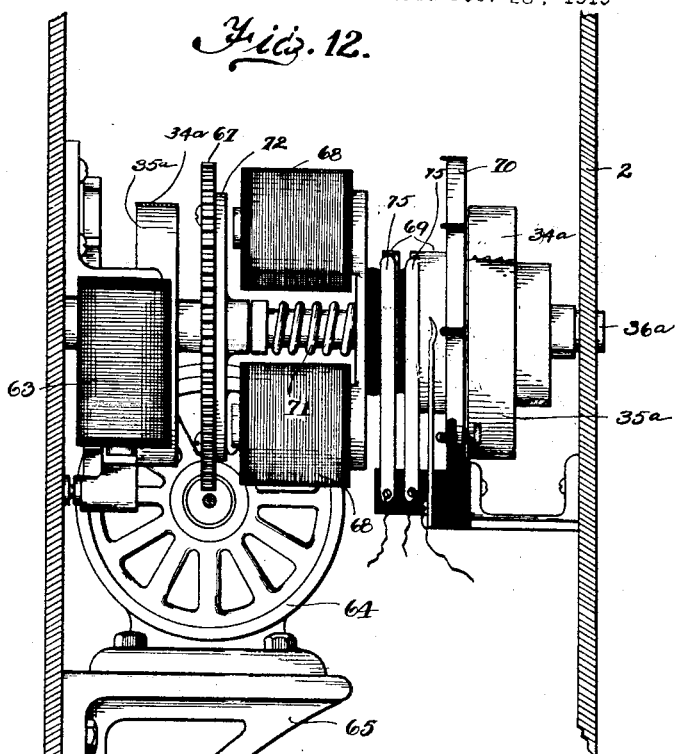
Figure 12 is an enlarged view of some of the mechanism shown in Figure 11.
Figure 13:
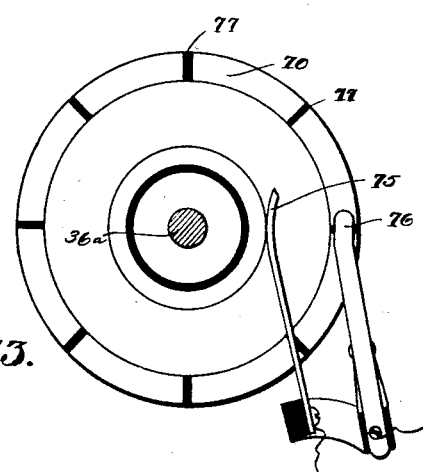
Figure 13 is an elevation of an automatic circuit breaker forming a part of the said mechanism.
Figure 15:
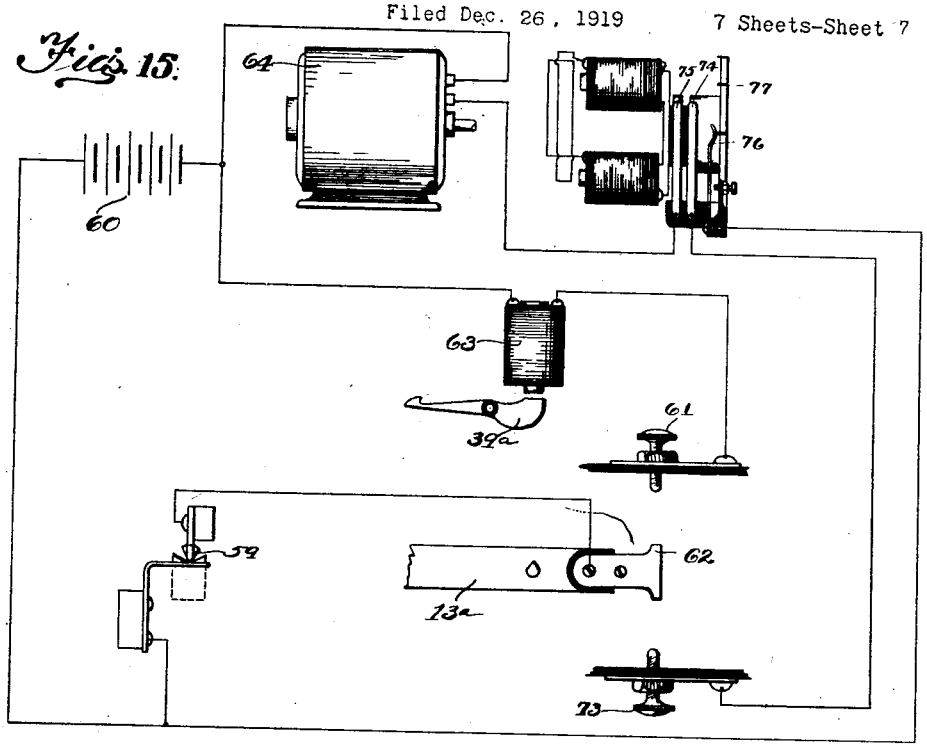
Figure 15 is a diagram of the operating circuits employed.
Figure 14:
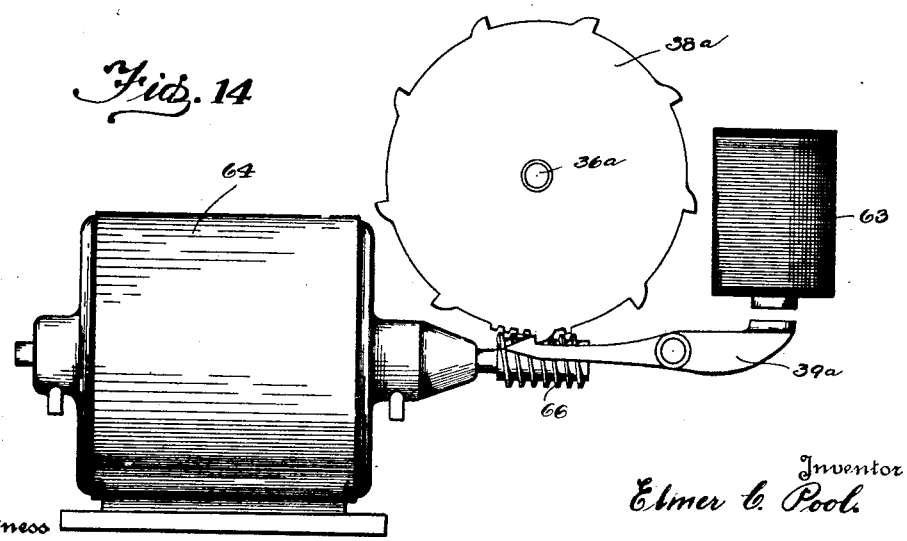
Figure 14 is a front elevation of an operating motor and a releasing pawl forming parts of said mechanism.

I have shown my invention as embodied in a scale having automatic pendulum weighing mechanism connected to beam weighing mechanism, but it is to be understood that my invention is also adapted for use in scales having other types of weighing mechanism and that I contemplate its use wherever applicable. The pendulum mechanism of the scale shown in the drawings is enclosed in a substantially watchcasing shaped head 1 supported upon a box-like cabinet 2 which houses the beam weighing mechanism of the scale.

Since my invention does not lie in the pendulum mechanism per se, I will describe it only in such detail as will suffice to show its co-operation with the beam weighing mechanism.

Immovably mounted within the head 1 is a frame comprising vertical members 3 which serve as guides for fulcrum sectors 4 of pendulums 5. The pendulums are suspended within the casing 1 by means of flexible steel bands or ribbons connected at their upper ends to the vertical guides 3 and lying between the outer faces of the guides and the curved faces of the corresponding fulcrum sectors, the lower ends of the ribbons being attached to the extremities of the fulcrum sectors. Rigid with the pendulums 5 and their fulcrum sectors are power sectors 6, and depending from the power sectors 6 are steel ribbons 7. The lower ends of the ribbons 7 are connected to an equalizer 8 which is in turn connected through a hook rod 9 to the beam weighing mechanism of the scale, later to be described. A compensating frame 10 is pivoted to the pendulums 5 on axes corresponding to the centers of curvature of the fulcrum sectors 4 so that when a downward pull is exerted upon the ribbons 7 and the pendulums 5 swing outwardly the frame 10 is carried vertically upwardly. Upward movement of the frame 10 acts through a rack and pinion (not shown) to swing an indicator hand 11 over a circular chart or dial 12 which is displayed through a crystal in one face of the head.

The main weighing beam 13 of the scale comprises two substantially parallel, rigidly-connected bars spaced as shown in Figure 4. The beam is suitably fulcrumed on knife edge pivots 14 and is provided with knife edge pivots 15 from which depends the steelyard 16 connected with the platform lever mechanism (not shown).

The connection with the hook rod 9 leading to the pendulum mechanism is also made through knife edge pivots 17, so that the operation of the scale is practically frictionless. For the purpose of protecting the pendulum mechanism from shocks and for damping the vibration of the scale so that it may come to rest promptly, a dash pot 18 is mounted within the cabinet 2 and the plunger thereof is connected through the link 19 to the free end of the lever 13.

In the operation of the scale when a load which is within the capacity of the pendulum mechanism is placed upon the platform, a downward pull is exerted upon the steelyard 16, causing the lever 13 to rock on its pivots 14 and thereby pull downwardly upon the link 9 and ribbons 7. Since the power sectors 6 project inwardly beyond the fulcrum sectors 4 the pendulums 5 will swing outwardly until the load on the scale platform is counterbalanced. The indicator hand, being mechanically connected to the pendulums, will at the same time move to a position over the chart 12 to correctly indicate the weight of the load.

If, however, the weight of the load is beyond the capacity of the pendulum mechanism, it must in part be counterbalanced by additional means. The additional means employed according to this invention consists of a plurality of unit weights or counterpoises 20 which are deposited upon the weighing mechanism as needed to counterbalance the major part of the load. For the purpose of receiving the unit weights a substantially rectangular rack 21 having uprights 22 at its ends is suspended by means of said uprights from the short arm of the lever 13 opposite to which the steelyard 16 is connected. The rack 21 is supported upon aligned pivots located at a fixed distance from the fulcrum of the lever, so that no matter how many unit weights are supported by the rack 21 the length of the lever arm upon which they act is unchanged. The sides of the rack are provided with a plurality of notches 24 which receive arms 25 extending laterally from the upper ends of the unit weights. The unit weights are in the form of slabs. When it is desired to make them of lesser weight they are simply made shorter and no change in the construction of the means for handling them is necessary.

For the purpose of lowering the weights onto the rack 21 and raising them therefrom I have provided a vertically-movable cage, the side members 27 of which include diagonal strips 28 each of which is provided with a plurality of stepped notches 30 corresponding in number and in lateral spacing to the notches 24 in the rack 21. The side members 27 of the cage are located immediately outside the sides of the rack 21, and are provided at their upper and lower ends with notched lugs 31 slidably engaging stationary vertical rods 32. The cage is thus guided in its vertical movements. As the cage moves downwardly the arms of the unit weights engage the bottoms of the notches 24 in the rack 21 and the weights are thus successively left suspended upon the rack. As the cage moves upwardly the weights are picked up in inverse order.

It will be noted upon inspection of Figures 4 and 6 that the arms of each of the weights are bent or offset so that the parts of the arms adapted to support the weight from the cage are at one side of the center of mass of the weight, while the parts of the arms adapted to support the weight from the rack are at the other side of its center of mass. This construction causes each weight as it is deposited upon the rack to swing away from the adjacent undeposited weight, thereby insuring absolute freedom of relative movement. When the weights are lifted from the rack a reverse swinging movement automatically takes place—that is to say, as each weight is lifted it swings into close relation with the adjacent weight on the cage and away from the adjacent weight on the rack.

For the purpose of raising and lowering the rack I have shown alternative forms of mechanism, that illustrated in Figures 1, 2 and 3 being semi-automatic in its action, and that illustrated in Figures 10 to 16 being automatically actuated by an electric device.

Referring first to the semi-automatic form, it will be obvious by inspection of

Figures 1, 2 and 3 that the cage 27 is supported by a pair of ribbons 34 which are mounted upon drums 35. The drums 35 are fixed upon a rotatable shaft 36 which is journalled in bearings in the cabinet 2 and may be turned by means of an external handle 37.

In order to releasably hold the cage in position to support any desired number of the unit weights, I have provided a ratchet and pawl, the ratchet 38 being fixed upon the shaft 36 and the pawl 39 being pivoted upon the wall of the casing 2. Depending from the end of the pawl opposite that engaging the ratchet is a rod 40, the lower end of which is in position to be engaged by the end of the lever 13 when it is rocked to a degree sufficient to move the pendulum mechanism and indicator hand 11 beyond the capacity of the chart 12. If a load the weight of which is appreciably in excess of the capacity of the chart be placed upon the scale platform, the lever 13 will engage the rod and thereby release the ratchet, allowing the cage to descend until enough weights have been deposited upon the rack 21 to move the lever out of engagement with the rod 40 and allow the pawl to again engage the ratchet. If, however, the load on the scale platform be but slightly in excess of the capacity of the pendulum mechanism, the lever 13 will not press upwardly upon the rod 40 with sufficient force to lift the rod and release the ratchet. The rod must in such case be manually raised. For the purpose of facilitating such occasional manual operations I have provided a handle 42 in the form of a ball which is fixed to the rod 40 by means of a stem 43 passing through a slot in the cabinet 2. This ball also serves to overweight the pawl 39 and releasably hold it in engagement with the ratchet 38.

Each of the unit counterpoises is sealed to such a weight that when the counterpoise is in position on the rack 21 it will counterbalance a part of the load on the platform equal in weight to the capacity of the dial 12. If, for example, the capacity of the dial be 2000 lbs. and the load on the platform be 6500 lbs., 6000 lbs. of load will be counterbalanced by three unit weights upon the rack 21 and the remaining 500 lbs. will be counterbalanced by the pendulum swinging to the requisite position. The part of the load offset by the pendulums will be indicated by the hand 11 and the part of the load counterbalanced by the unit weights will be indicated by a flash 45 connected to the weight-depositing mechanism in a manner which will be understood from the following paragraph.

Since the cage as it is elevated picks up one unit weight after another, it is evident that the resistance offered by the cage would, unless means were provided for offsetting the increase in weight, become progressively greater as the ribbons were wound upon the drum 35. This difficulty I have overcome by the use of an inverted pendulum 46 fixed upon a rotatable shaft 47 which is journalled in the cabinet 2, the shaft 47 having an arm 49 fixed thereto and connected at its free end to a ribbon 48 which is wound upon a small drum 50 on the shaft 36. As the weight of the cage and the supported weights increases the leverage of the pendulum 46 also increases, and the resultant resistance to the turning of the handle 37 is thereby kept substantially uniform. The shaft 47 also carries a short arm 51, to the free end of which is pivoted a link 52. The link 52 is connected to a lever 53 which in turn is connected through a link 54 to the flash 45. It is obvious, therefore, that as the cage 27 moves upwardly or downwardly its movement is communicated through the mechanism just described to the flash 45. The characters on the flash are so arranged that the number displayed through the dial always represents the amount of weight offset by the unit weights.

The mechanism illustrated in Figures 10 and 16 inclusive eliminates all manipulation of the weighing mechanism. In this form of the device the shaft 36$^a$ carrying the drums 35$^a$ is not provided with a handle and the pawl 39$^a$ which co-operates with the ratchet 38$^a$ is not pivoted to a depending rod for engaging the weighing beam, but is overweighted to normally remain in engagement with the ratchet.

The beam 13$^a$ is electrically connected adjacent its fulcrum pivot at 59 to one pole of a source of current 60, the other pole of which is connected to a contact screw 61 so arranged as to be engaged by a contact 62 on the lever 13$^a$ when the lever is rocked beyond the limit determined by the capacity of the chart. Engagement of the screw 61 and contact 62 closes a circuit which energizes a magnet 63 and thereby disengages the pawl 39$^a$ from the ratchet 38$^a$ and allows the cage to descend. As soon, however, as enough unit weights have been placed upon the lever 13$^a$ to move the contact 62 out of engagement with the screw 61 the magnet 63 is de-energized and the overweighted pawl 39$^a$ again engages the ratchet 38$^a$, thus preventing further descent of the cage. The major part of the load is thus counterbalanced by the unit weights and indicated by the flash hereinbefore described, while the remainder is counterbalanced by the pendulums and indicated on the dial.

For the purpose of automatically elevating the cage and thereby lifting the unit weights when the weighing operation is completed, I employ a small motor 64 secured upon the bracket 65 within the cabinet 2. The shaft of the motor terminates in a worm 66 which meshes with the worm wheel 67 rotatably but non-slidably mounted on the shaft 36ª. When the cage descends the shaft 36ª rotates without moving the worm wheel 67.

Slidably keyed upon the shaft 36ª is a magnetic clutch comprising a pair of magnets 68, contact rings 69, and a segmental contact ring 70 having a series of circuit breakers therein. A helical spring 71 surrounds the shaft 36ª and normally holds the magnets out of engagement with a soft iron disk 72 secured to the worm wheel 67.

The magnetic clutch is wired in series with the motor. Mounted below the contact 62 is a contact screw 73. When a load which has been partly counterbalanced by unit weights is removed from the scale platform the unit weights on the beam 13ª cause the contact 62 to swing into engagement with the screw 73 and thereby close a circuit through brushes 74 and 75, the magnets 68 and the motor 64. The magnets being energized spring into engagement with the soft iron disk 72 and thus clutch the shaft 36ª to the worm wheel 67. As the worm wheel is turned by the now active motor the ribbons 34ª are wound upon the drums 35ª until the cage has been elevated sufficiently to remove all the unit weights from the lever 13ª, and as soon as the last weight is removed from the lever the contact 62 swings out of engagement with the screw 73. It is necessary, however, to keep the motor running until the weight has been lifted enough above the beam so that there will be no interference during the weighing of loads within the capacity of the dial. It is also necessary to prevent the cage from settling when the clutch is de-energized. I have accomplished both of these results by providing an auxiliary circuit which remains closed even after the contact 62 moves away from the screw 73. This circuit operates from the source of current through a brush 76 and the segmental contact ring 70 and thence through the clutch and the motor. When the last weight is removed from the lever 13ª the brush 76 is in contact with a portion of the ring 70 between two of the circuit breakers 77 and the clutch is not disengaged nor the motor stopped even though the contacts 62 and 73 be broken, but the elevating mechanism continues to operate until the next ratchet tooth rides over the pawl 39ª. The pawl is then in position to prevent the shaft 36ª from turning backwardly. The auxiliary circuit is broken at this time by one of the circuit breakers 77 insulating the brush 76 from the ring 70 and the spring 71 forces the magnets out of engagement with the soft iron disk 72 and the ring 70 away from the brush 76 so that the cage may again descend when the pawl 39ª is disengaged from the ratchet 38ª.

It is apparent that since the cage elevating mechanism is automatically actuated whenever there are too many unit weights on the beam to be counterbalanced by the part of the load not offset by the pendulum mechanism, surplus weights will be lifted if a portion of the load be removed from the scale platform. The scale will therefore automatically come to balance whether the load on the platform be added to or subtracted from.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, load-offsetting means comprising, in combination, a beam, a plurality of unit weights, means for supporting said unit weights in echelon above and transversely of said beam, and means for lowering said supporting means and thereby successively depositing said weights in a transverse row upon said beam.

2. In a weighing scale, load-offsetting means comprising, in combination, beam weighing mechanism, a plurality of unit weights, a cage, the side members of said cage having stepped notches for supporting said unit weights in echelon, and means for lowering said cage and thereby successively depositing said weights upon said beam weighing mechanism.

3. In a weighing scale, load-offsetting means comprising, in combination, a plurality of unit weights, a rack pivotally supported on said beam, said rack having a transverse series of notches adapted to receive said unit weights, a cage, said cage having a stepped series of notches corresponding to those of said rack, said unit weights being normally supported in the notches of said cage, and means for lowering said cage and thereby causing said weights to successively engage the notches in said rack.

4. In a weighing scale, load-offsetting means comprising, in combination, a beam, a rack member pivotally supported by said beam, a cage member normally positioned above said beam, said rack member and cage member having corresponding series of notches, the notches in one of said members being stepped, a series of unit weights normally supported in the notches of said cage member, and means for lowering said cage member to successively place said weights in the notches of said rack member.

5. In a scale, in combination, beam weighing mechanism, a series of unit weights each having offset arms, each of said arms having an oppositely-offset portion, means unconnected with said beam weighing mechanism engaging said oppositely-offset portions to support said weights, and means carried by said beam weighing mechanism to engage said offset arms to support said weights.

6. In a scale, in combination, beam weighing mechanism, a series of unit weights each having offset arms, each of said arms having an oppositely-offset portion, means unconnected with said beam weighing mechanism engaging said oppositely-offset portions to support said weights, means carried by said beam weighing mechanism to engage said offset arms to support said weights, and means to move the first said means to transfer said weights to said beam carried means.

7. In a scale, in combination, beam weighing mechanism, means carried by said beam weighing mechanism adapted to receive a series of unit weights, means supporting a series of unit weights in echelon above said receiving means, each of said weights having a member for engaging said supporting means, and a member offset relatively thereto adapted to engage said receiving means whereby as each weight is received by said receiving means it swings away from the succeeding weight on said support.

8. A unit weight consisting of a slab-like body and arms, each arm having portions oppositely offset relative to the central plane of said body.

9. In a scale, means for successively depositing a series of weights, comprising, in combination, a weight support, and a weighted arm so connected to said support as to swing upwardly toward a vertical position as weights are removed from said support.

10. In a scale, means for successively depositing a series of weights, comprising, in combination, a support, means for lowering and raising said support, a plurality of weights on said support arranged to be successively deposited as said support is lowered and picked up in inverse order as said support is raised, an inverted pendulum connected to said support, and means for swinging said pendulum toward a vertical position as said support is lowered.

11. In a scale, means for successively depositing a series of weights, comprising, in combination, a drum, a flexible member wound upon said drum, a weight support suspended by said flexible member, a series of weights on said support arranged to be successively deposited as said support is lowered and picked up as said support is raised, a second drum connected to the first said drum, a flexible member wound upon said second drum, and an inverted pendulum, said flexible member being connected to said inverted pendulum to raise the same as said support is lowered.

12. In a scale, in combination, a weighing beam, a counterpoise support adapted when lowered to place weights on said beam and when raised to pick up said weights, means for holding said support in elevated position, a circuit arranged to be closed by movement of said beam due to an excess of load on the scale, means actuated by said circuit to release said holding means and allow said support to descend, a second circuit arranged to be closed by movement of said beam due to an excess of weights on said beam, means actuated by said second circuit to elevate said support, an auxiliary circuit adapted to actuate said elevating means, means actuated by the operation of said elevating means to close said auxiliary circuit, and means for breaking said auxiliary circuit when said support reaches its position of maximum elevation.

13. In a weighing scale, in combination, load counterbalancing means, and an elevating device for said load counterbalancing means comprising a shaft, a rotatable member mounted thereon, a motor for rotating said member, an electric clutch member slidably and non-rotatably mounted on said shaft and adapted when energized to move into engagement with said rotatable member, said clutch member including a pair of contact rings and a plurality of mutually-insulated segments, brushes engaging the peripheries of said rings and wired in series with said motor and clutch member, a brush successively engaging the faces of said segments and also wired in series with said motor and clutch member, and a spring adapted when the circuits through all said brushes are broken to move said clutch member out of engagement with said rotatably-mounted member and the last said brush.

ELMER C. POOL.

Witnesses:
H. G. MILLER.
GEORGE S. MILLER.